US 8,908,098 B2

(12) United States Patent
Fan

(10) Patent No.: US 8,908,098 B2
(45) Date of Patent: Dec. 9, 2014

(54) METHOD AND APPARATUS FOR INTERACTING WITH TELEVISION SCREEN

(71) Applicant: Nongqiang Fan, Hauppauge, NY (US)

(72) Inventor: Nongqiang Fan, Hauppauge, NY (US)

( * ) Notice: Subject to any disclaimer, the term of this patent is extended or adjusted under 35 U.S.C. 154(b) by 0 days.

(21) Appl. No.: 14/325,024

(22) Filed: Jul. 7, 2014

(65) Prior Publication Data

US 2014/0320744 A1 Oct. 30, 2014

Related U.S. Application Data

(63) Continuation of application No. 13/840,320, filed on Mar. 15, 2013, now Pat. No. 8,773,591.

(51) Int. Cl.
*H04N 5/445* (2011.01)
*H04N 5/44* (2011.01)
(52) U.S. Cl.
CPC ...... *H04N 5/4403* (2013.01); *H04N 2005/4408* (2013.01); *H04N 2005/443* (2013.01); *H04N 2005/4432* (2013.01)
USPC .......................................... 348/563; 348/734
(58) Field of Classification Search
USPC ............ 348/734, 725, 563, 564, 569; 725/37, 725/39, 40; 345/628, 169, 173, 158, 156
IPC ..................... H04N 5/44,5/445, 5/50
See application file for complete search history.

(56) References Cited

U.S. PATENT DOCUMENTS

| 7,301,530 | B2 * | 11/2007 | Lee et al. ...................... 345/158 |
| 7,420,540 | B2 * | 9/2008 | Olbrich ........................ 345/158 |
| 2008/0300055 | A1 | 12/2008 | Lutnick et al. |
| 2011/0063522 | A1 * | 3/2011 | Karaoguz et al. ............ 348/734 |
| 2011/0187678 | A1 | 8/2011 | Salaverry et al. |
| 2011/0199339 | A1 | 8/2011 | Briden et al. |
| 2011/0248941 | A1 * | 10/2011 | Abdo et al. ................... 345/173 |
| 2012/0280927 | A1 | 11/2012 | Ludwig |
| 2013/0290876 | A1 | 10/2013 | Anderson et al. |
| 2013/0307796 | A1 | 11/2013 | Liu et al. |
| 2014/0098085 | A1 | 4/2014 | Lee et al. |

* cited by examiner

*Primary Examiner* — Sherrie Hsia

(57) ABSTRACT

A method of interacting with a television screen using a remote control having a viewing screen. The method includes the following: (1) displaying a boundary-identifier, on the viewing screen that is substantially transparent, to specify the boundary of an effective input-area; (2) detecting one or more positions being touched on the viewing screen after the boundary-identifier is displayed on the viewing screen; and (3) determining at least one mapped position on the television screen, wherein the at least one mapped position is mapped from a position among the one or more touching positions on the viewing screen of the remote control under a mapping operative to map one of an irregular quadrilateral and a trapezoid to a rectangular. The method also includes determining the effective input-area, which includes analyzing the image of the television screen obtained with a camera on the remote control.

20 Claims, 13 Drawing Sheets

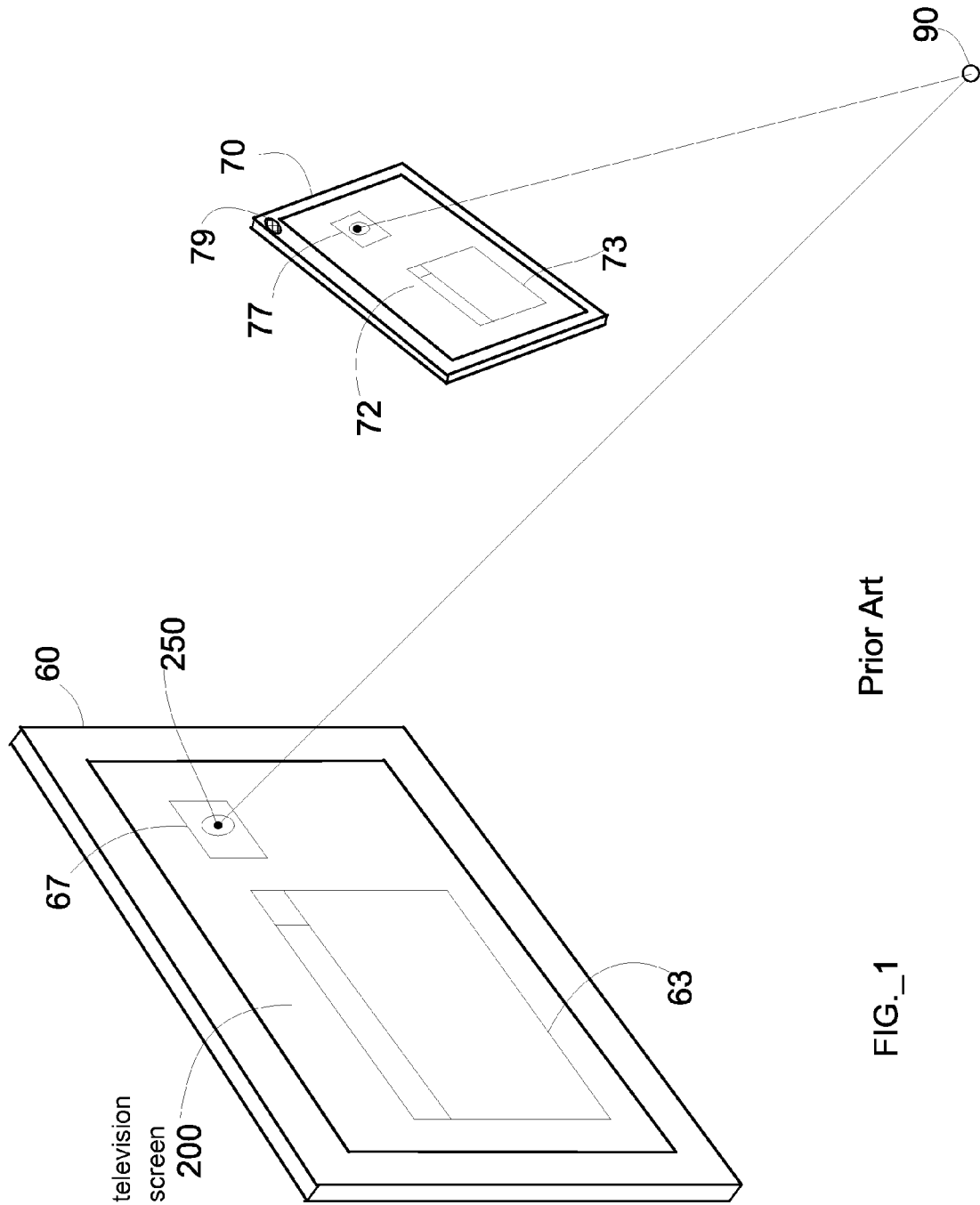
FIG._1  Prior Art

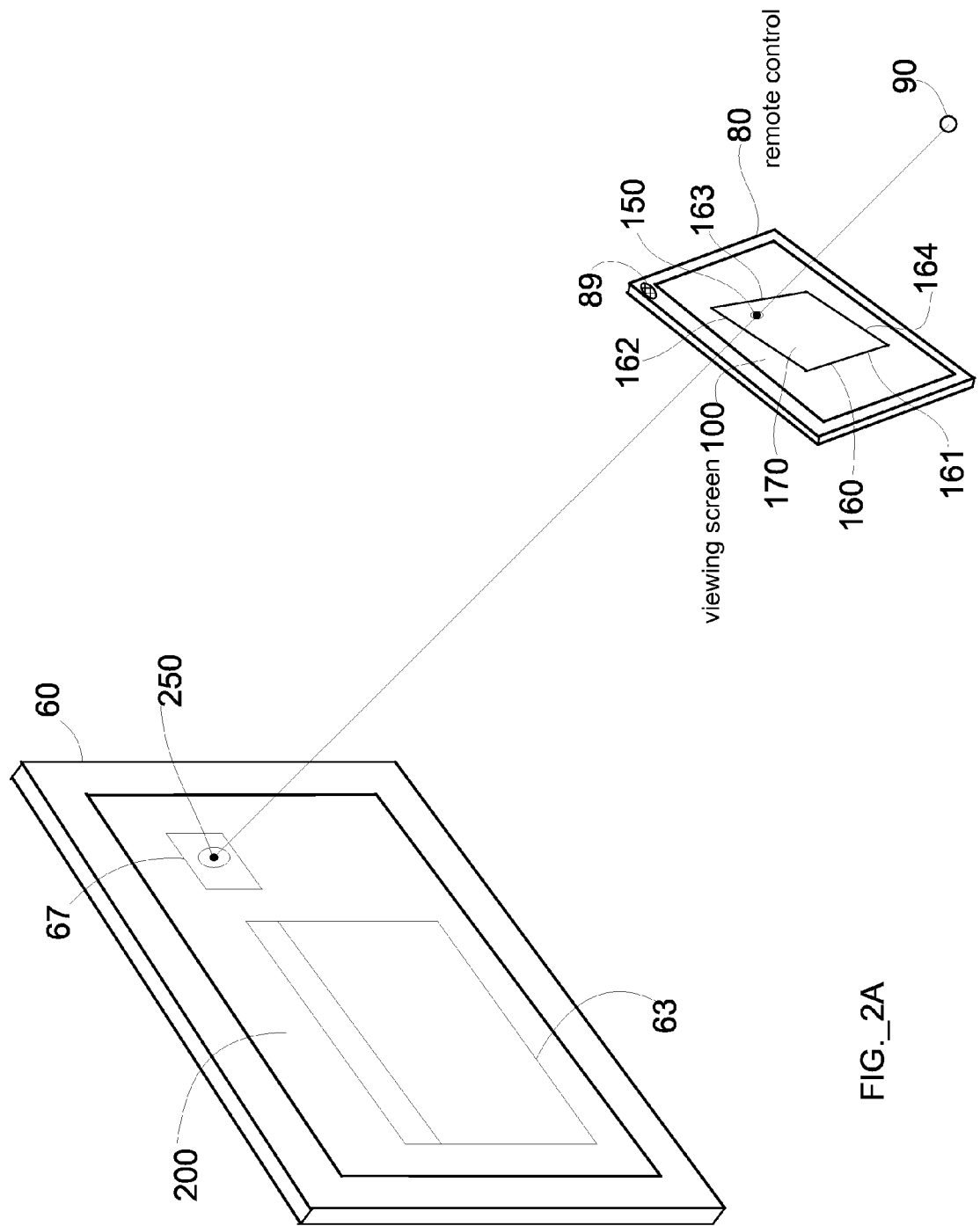
FIG._2A

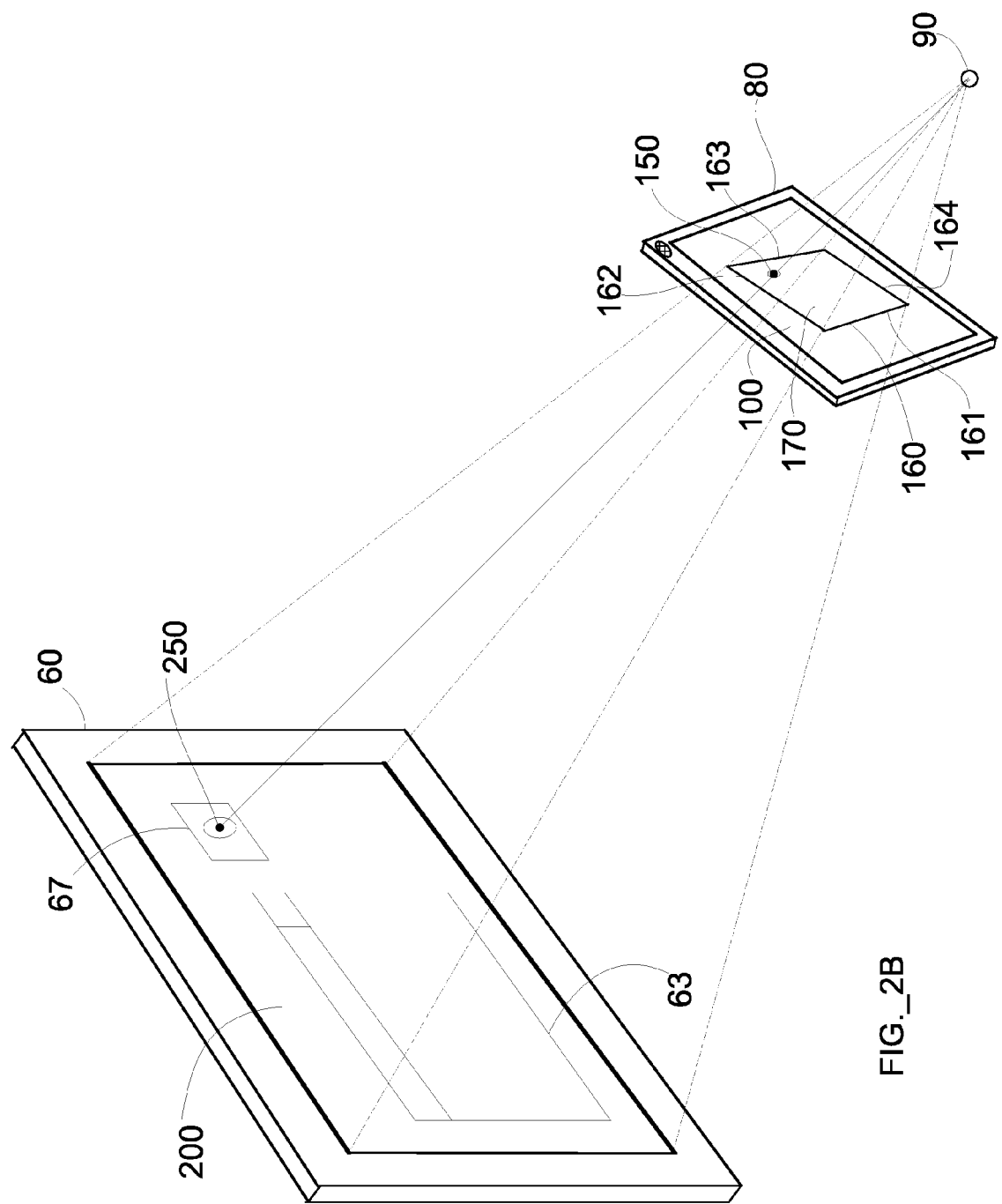
FIG._2B

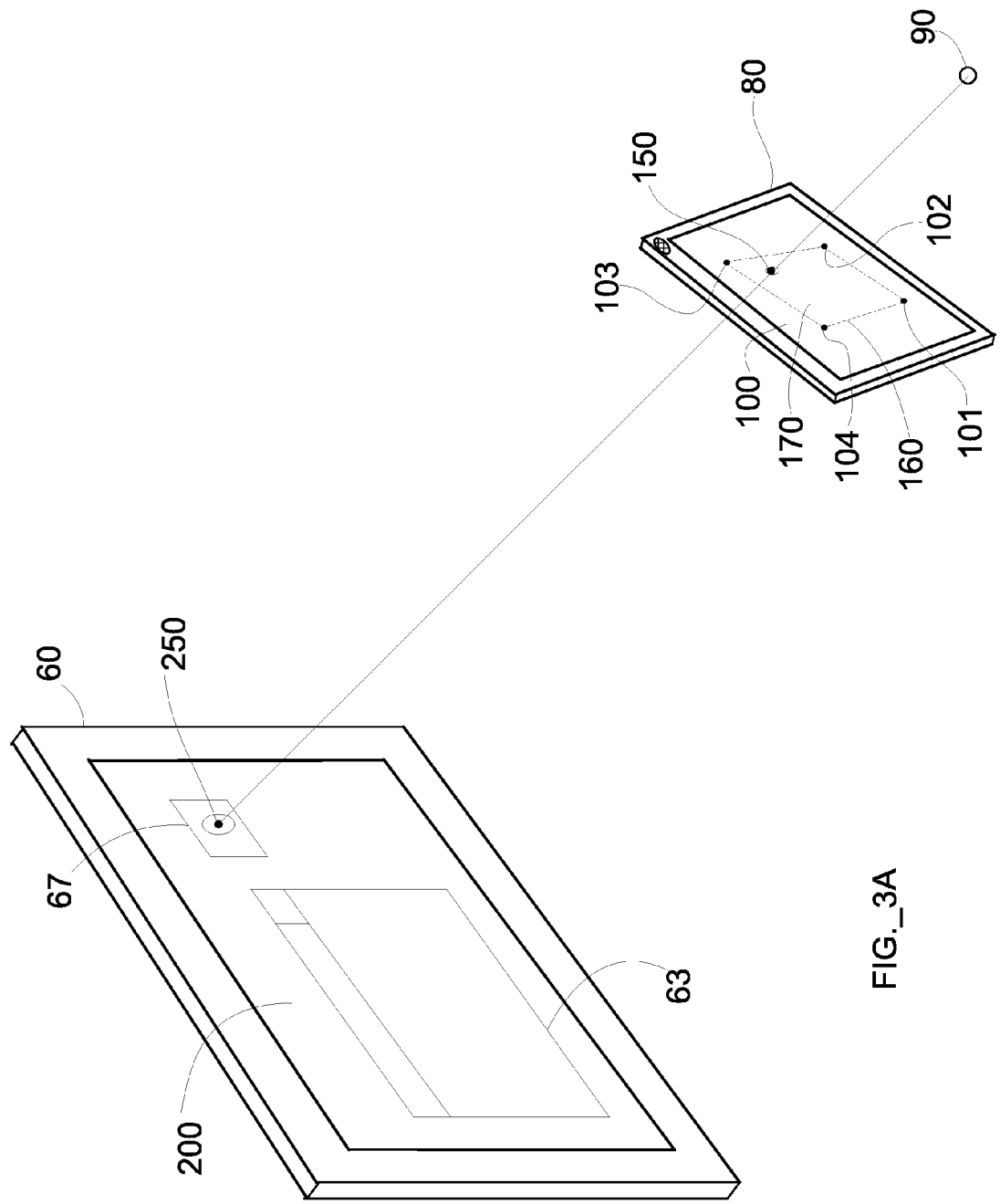
FIG._3A

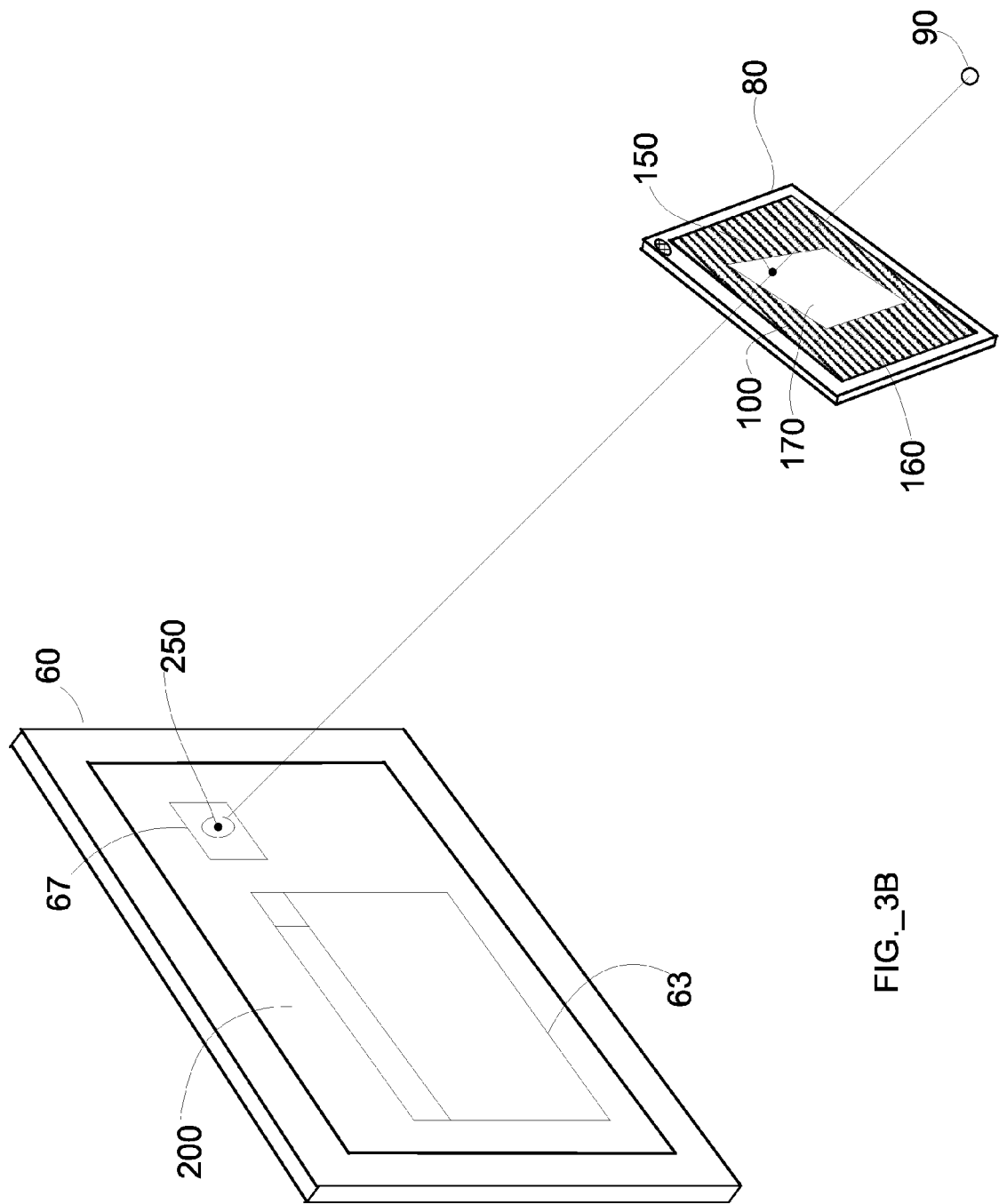
FIG._3B

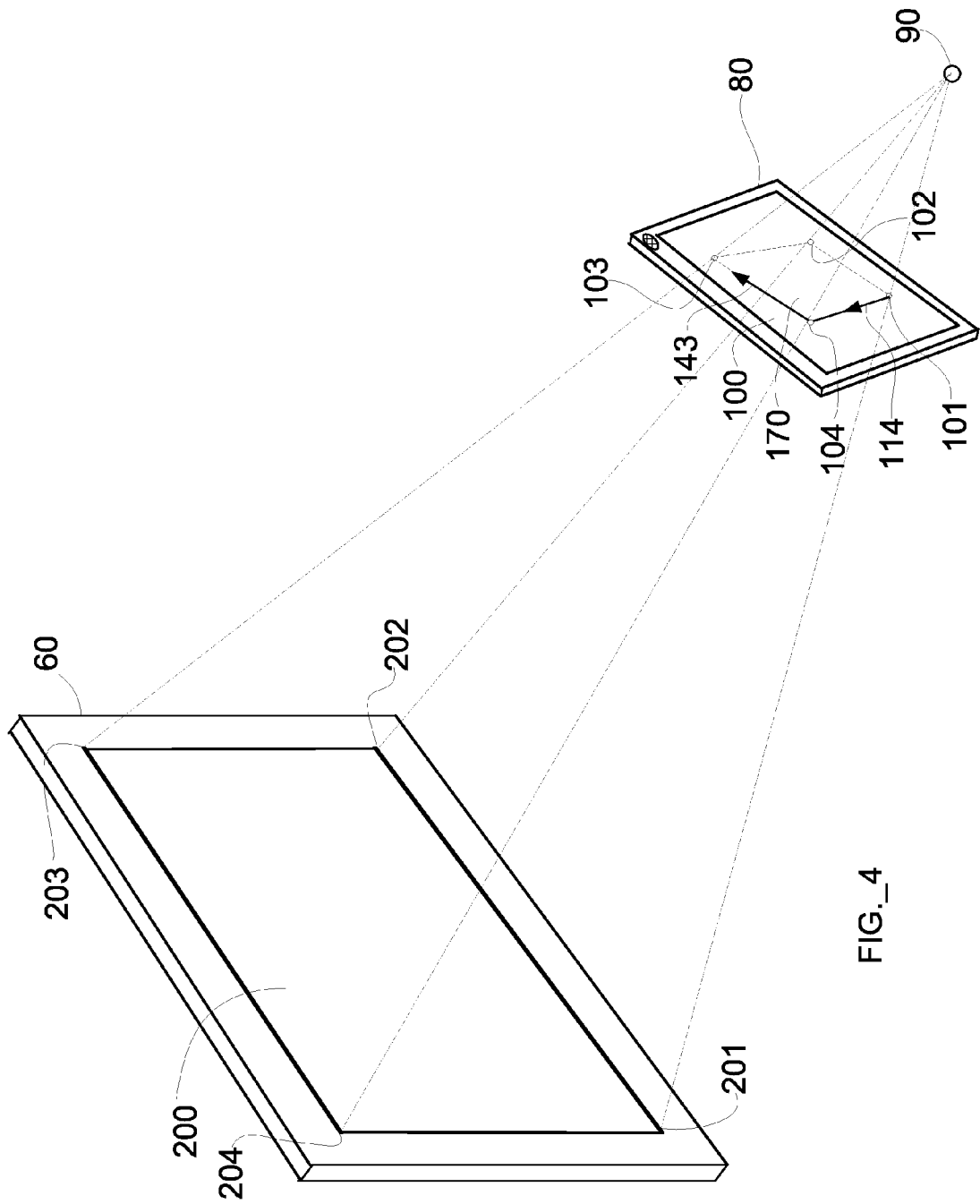
FIG._4

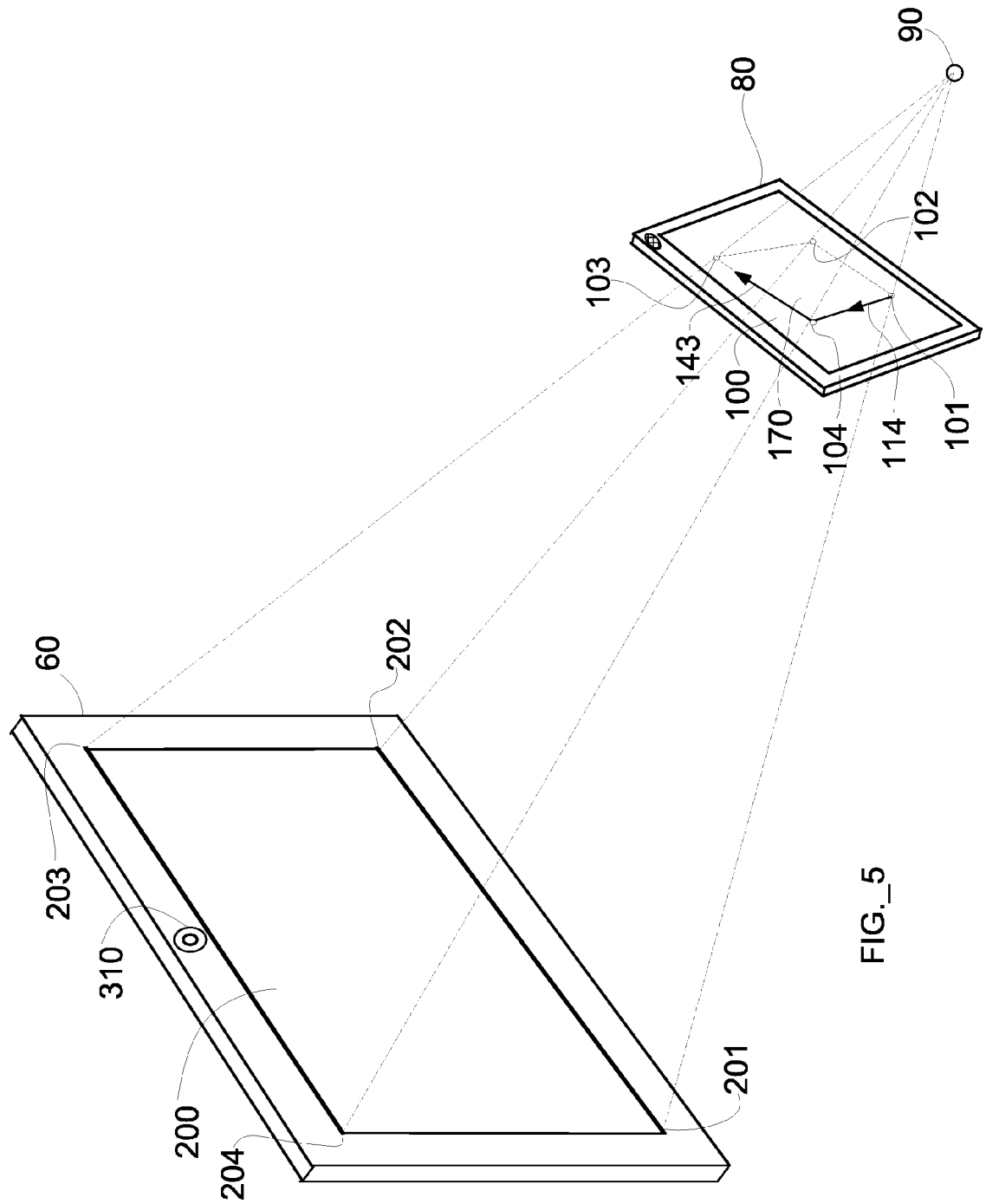
FIG._5

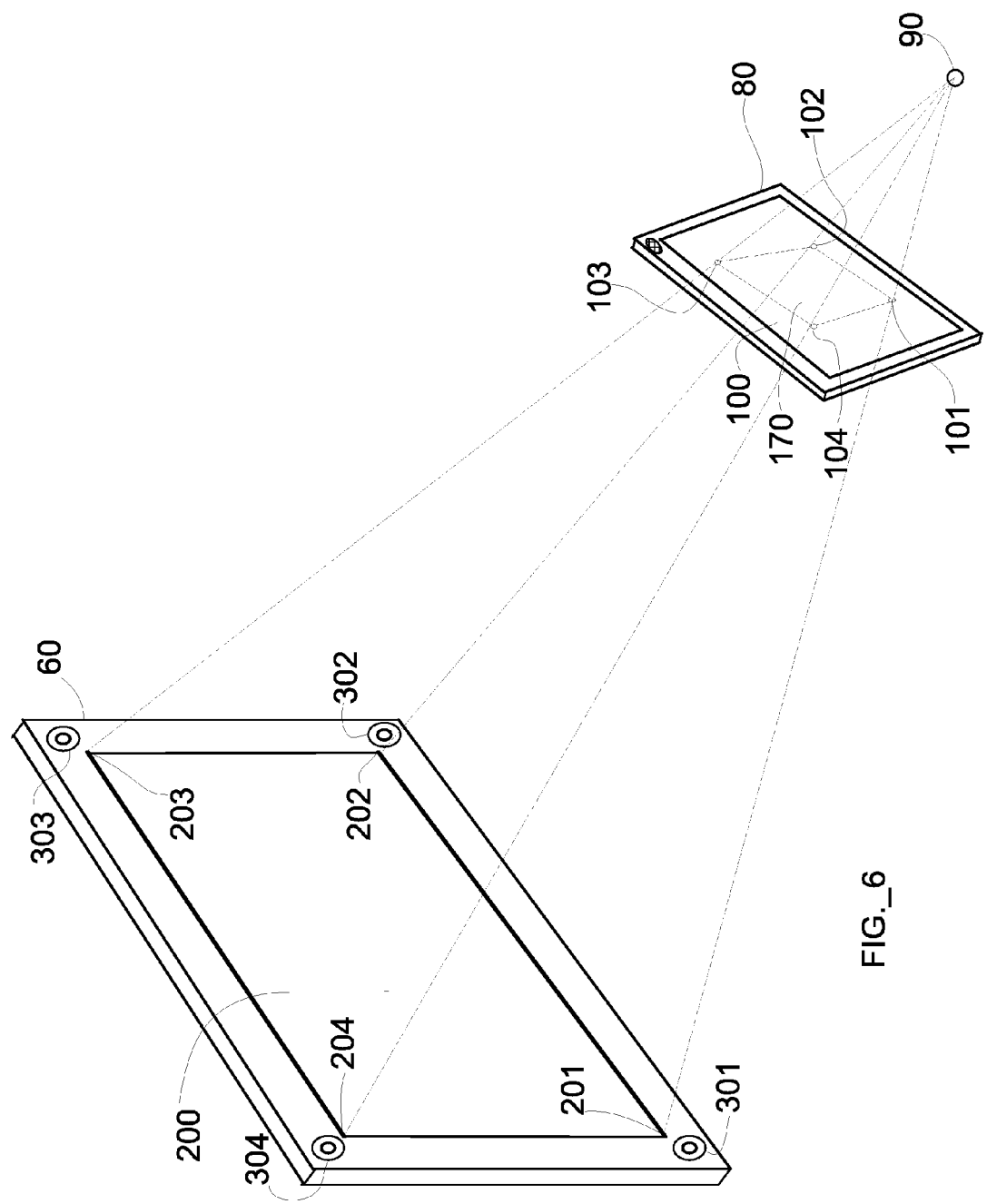
FIG._6

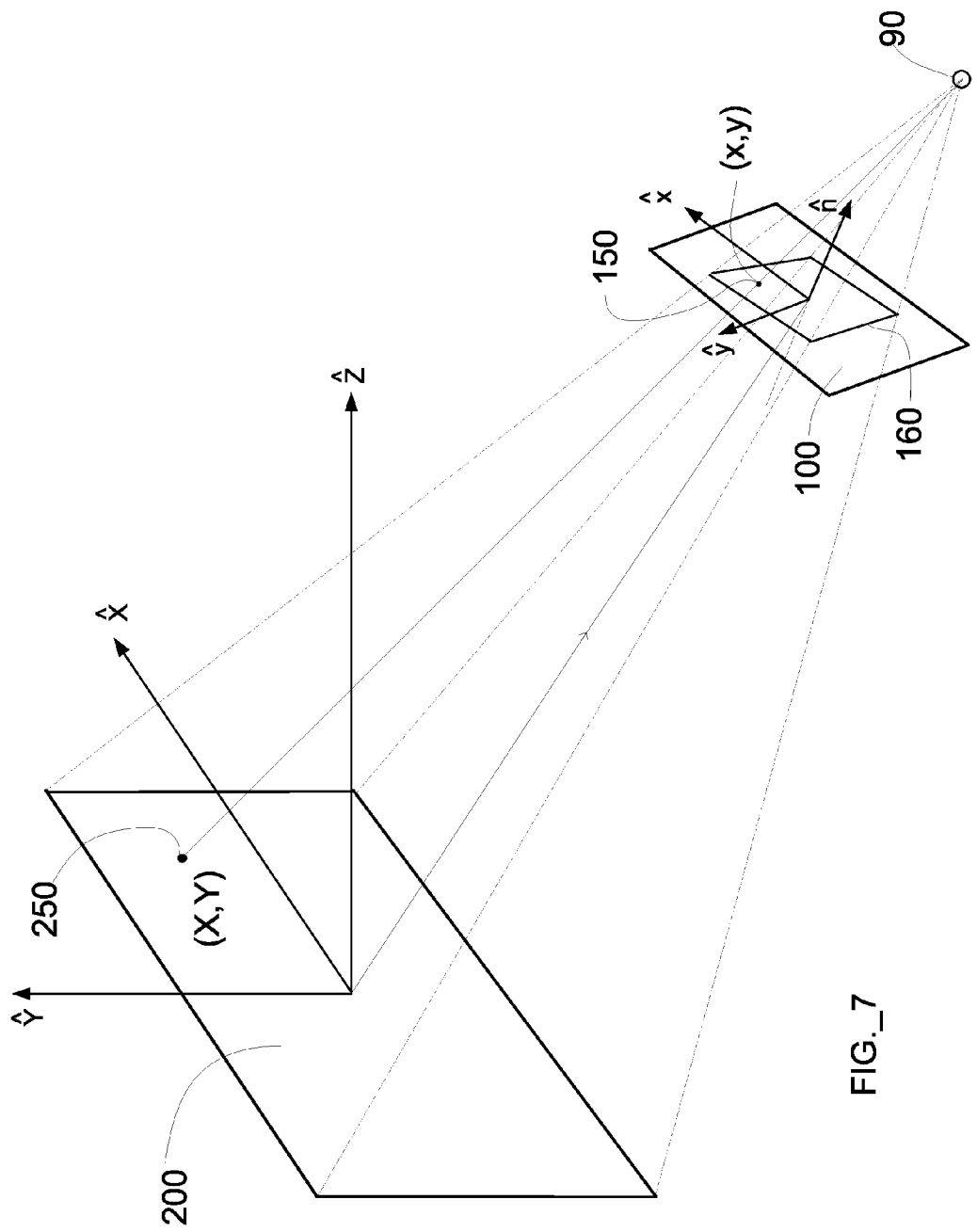
FIG._7

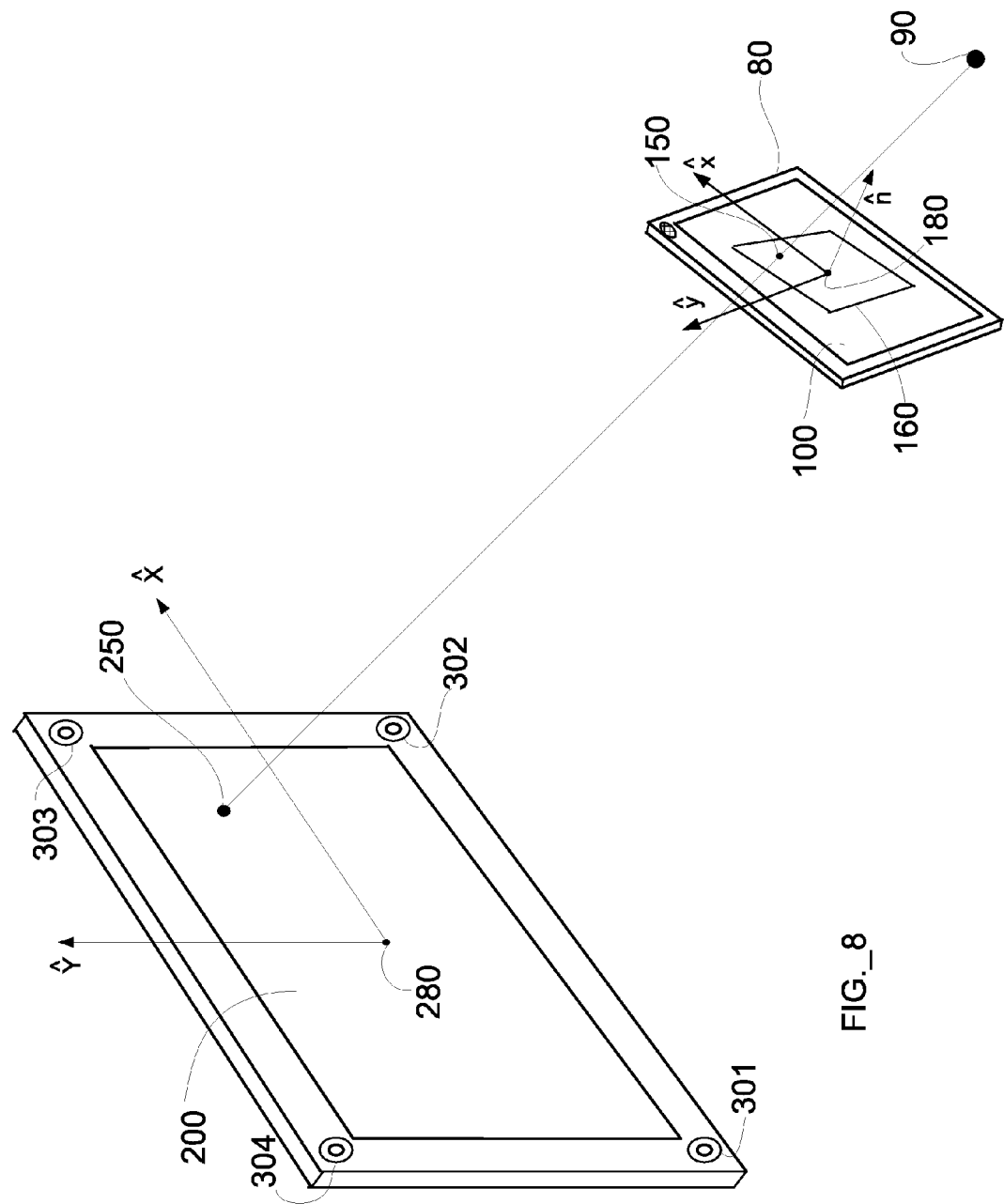
FIG._8

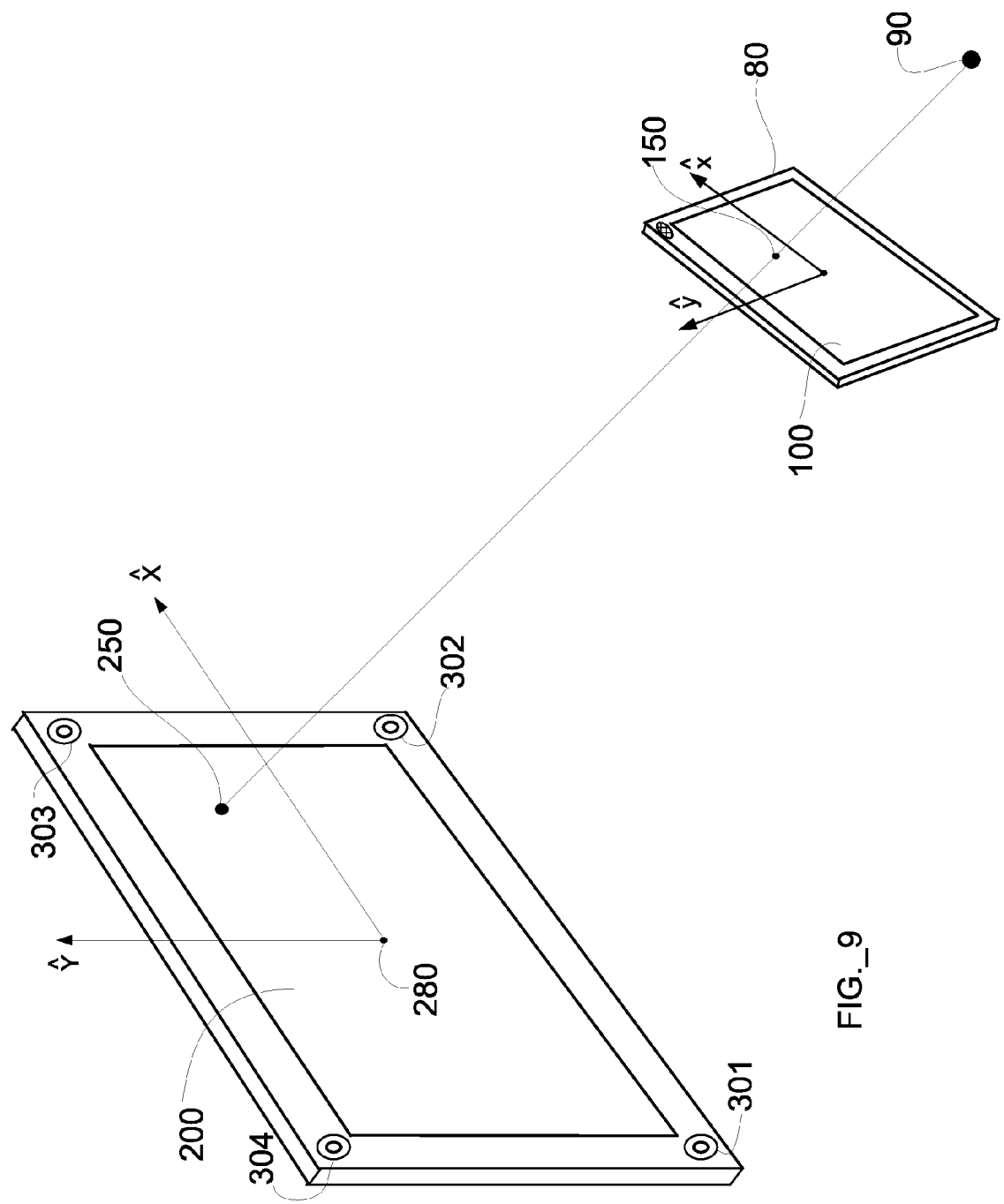
FIG._9

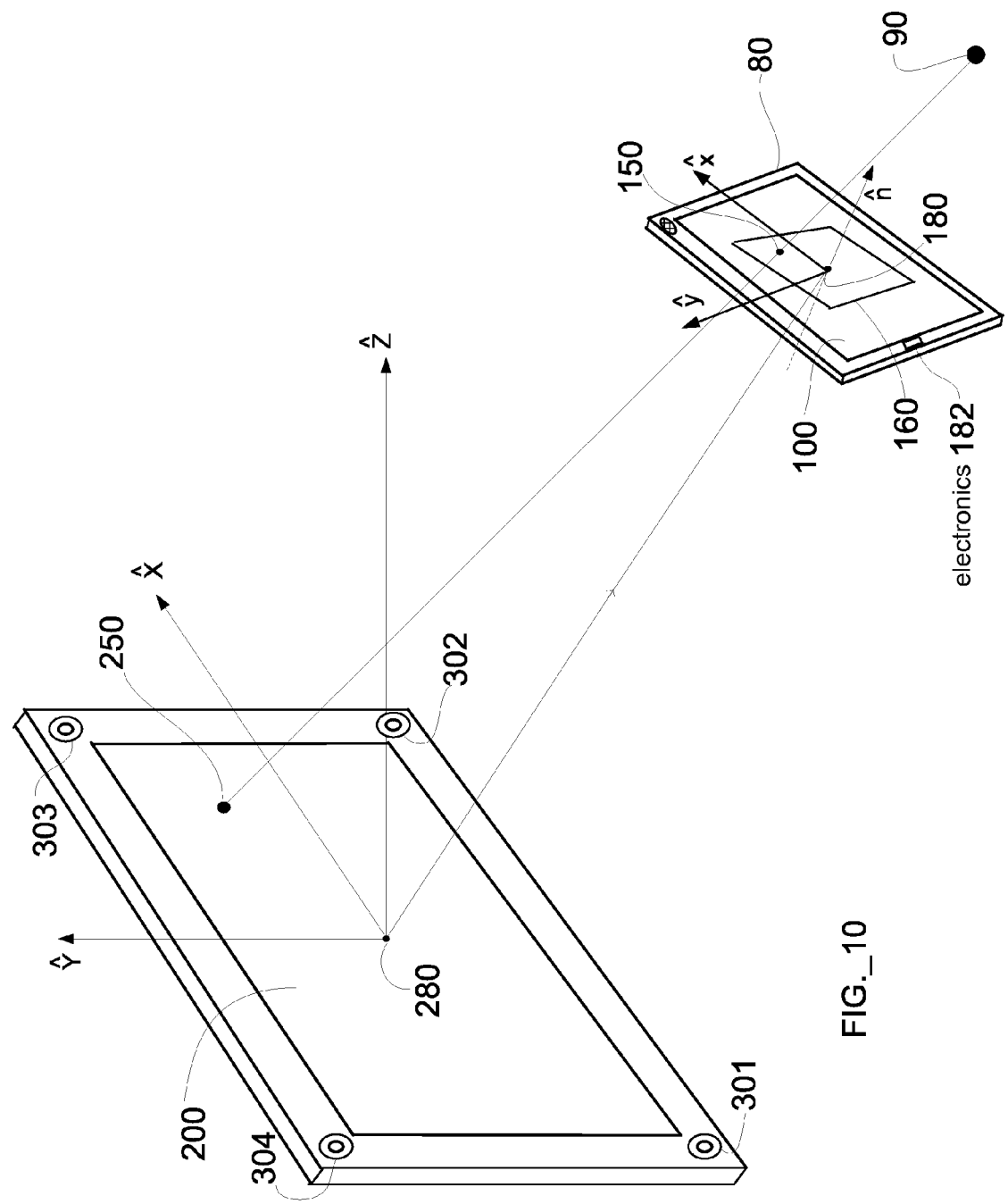
FIG._10

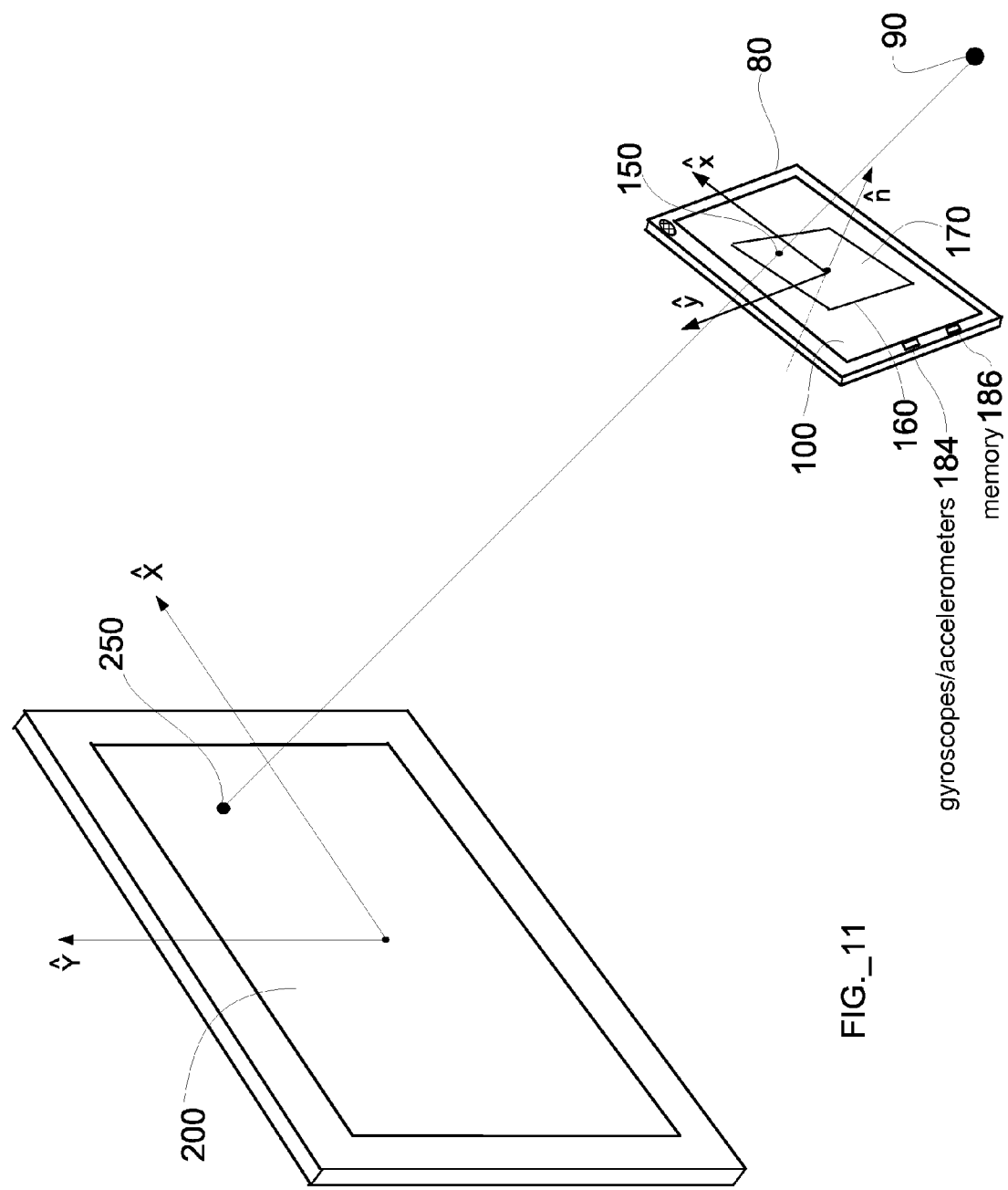
FIG._11

METHOD AND APPARATUS FOR INTERACTING WITH TELEVISION SCREEN

RELATED APPLICATIONS

The present application is a continuation of patent application Ser. No. 13/840,320, to be issued as U.S. Pat. No. 8,773,591, which is related to and claims benefit under 35 U.S.C. §119(e) from U.S. Provisional Patent Application Ser. No. 61/682,759, filed Aug. 13, 2012, titled "METHOD AND APPARATUS FOR CONTROLLING A TELEVISION." The present application is also related to U.S. Pat. No. 8,736,773.

BACKGROUND

The present disclosure relates generally to controlling displayed contents on the television screen at a visual distance.

FIG. 1 shows that multiple screens are often used to display the same graphic content. Such multiple screens experience is considered by many as the future of home computing or electronic gaming system. For example, the same graphic content can be simultaneously displayed on the screen 200 of a television 60 and on the screen 72 of another portable device 70, such as, a table computer or a smartphone. Specifically, graphic objects 63 and 67 the screen 200 of the television 60 can be simultaneously displayed as graphic objects 73 and 77 respectively on the screen 72 of the portable device 70. The screen 72 of the portable device 70 is often a touch-screen, and a user can use such touch-screen to control the graphic contents on the television screen 200 or to interact with the television 60 remotely. The portable device 70 often includes a transceiver 79 to communicate wirelessly with the television 60.

Applicant discovered that there is a need for an improved method and apparatus for controlling a graphic display at a distance. Specifically, despite the fact that the multiple screen system as shown in FIG. 1 is commonly used by many people, older people with limited vision can find such multiple screen system is difficult to use. Some older people need a reading glass to read the contents on the screen 72 of the portable device 70, but they will have to take-off the reading glass to read the contents on the screen 200 of the television 60. On the other hand, some other older people need a distance glass to read the contents on the screen 200 of the television 60, but they will have to take-off the distance glass to read the contents on the screen 72 of the portable device 70. It is desirable to control the displayed contents on the television screen 200 or to interact with the television 60 remotely without the need to look at the same graphic contents on another screen (e.g., the screen 72 of the portable device 70).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 shows that the same graphic content can be simultaneously displayed on the screen of a television and on the screen of another portable device.

FIGS. 2A-2B depict that a user can use a transparent viewing screen of a remote control device to interact with the television remotely in accordance with some embodiments.

FIGS. 3A-3B depict implementations for displaying the boundary-identifier on the transparent viewing screen of a remote control device FIG. 4 depict that, in accordance with some embodiments, a user can generate a set of touching positions on a sensing screen to determine the boundary-identifier to be displayed.

FIG. 5 depict that, in accordance with some embodiments, a user can generate a set of touching positions on a variable-reflectivity screen to determine the boundary-identifier to be displayed.

FIG. 6 depict that, in accordance with some embodiments, four cameras on the television can be used to capture images of an eye though the transparent viewing screen and to determine the mapping between a position on the television screen to a corresponding position on the viewing screen.

FIG. 7 shows that the mapping between a position on the television screen and a corresponding position on the viewing screen in accordance with some embodiments.

FIG. 8 shows that, in accordance with some embodiments, a touch position can be mapped to a corresponding position on the television screen using the mapping determined in real time while the boundary-identifier for such mapping is displayed.

FIG. 9 shows that, in accordance with some embodiments, a touch position can be mapped to a corresponding position on the television screen using the mapping determined in real time with no boundary-identifier displayed.

FIG. 10 shows that, in accordance with some embodiments, the shape of the boundary-identifier can dynamically depend upon the location of the viewing screen and the surface orientation of the viewing screen.

FIG. 11 shows that, in accordance with some embodiments, the shape of the boundary-identifier can be configured to change with the surface orientation of the viewing screen.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIGS. 2A-2B depict that a user can use a transparent viewing screen 100 of a remote control device 80 to control the graphic contents on television screen 200 or to interact with the television 60 remotely, without the need to look at the same graphic contents on another screen, in accordance with some embodiments. In FIGS. 2A-2B, the transparent viewing screen 100 is operative to detect at least one touching position 150 on the viewing screen 100 touched by one or more fingers of a user. In some implementations, the transparent viewing screen 100 can be a touch-screen. When the transparent viewing screen 100 is a touch-screen or a proximity-sensing screen, the at least one touching position 150 touched by one or more fingers can be detected with electronics on the remote control device 80. In still other implementations, the transparent viewing screen 100 can be a variable-reflectivity screen, and optical reflectivity at the touching position 150 on the screen touched by one or more fingers is implemented to change with touching. Such change of optical reflectivity due to finger touching can be observed by one or more cameras fixed relative to the television screen 200.

Additionally, the transparent viewing screen 100 is also operative to display a boundary-identifier 160 on the viewing screen to specify the boundary of an effective input-area 170 that is in the shape of a quadrilateral. In some implementations, the transparent viewing screen 100 can be a transparent LCD display or a transparent OLED display. The boundary-identifier 160 can be displayed with four straight lines 161, 162, 163, and 164 forming the four sides of a quadrilateral. In some implementations, the transparent viewing screen 100 may only need to display binary levels to show the four straight lines 161, 162, 163, and 164. Certainly, in some implementations, the transparent viewing screen 100 with gray levels is used.

The remote control device 80 also includes a controller configured to determine a mapped position 250 on the screen 200 that is mapped from a corresponding touching position 150 on the viewing screen 100 detected by the viewing screen after the boundary-identifier 160 is displayed. The mapped position 250 is mapped from the corresponding touching position 150 with a mapping operative to map the quadrilateral 160 to a display boundary of the screen 200. The display boundary of the screen 200 generally is in the shape of rectangular that is different from the shape of the quadrilateral 160. Unless the viewing screen 100 at some particular location and is orientated in some particular direction, the shape of the quadrilateral 160 generally is not a rectangle, and it can be in the shape of a trapezoid or an irregular quadrilateral. The remote control device 80 can be implemented to wirelessly communicate with the television 60. For example, as shown in FIG. 2A, the remote control device 80 can include a transceiver 89 to communicate with the television 60 wirelessly.

In operation, after the boundary-identifier 160 is displayed on the viewing screen 100 to specify the boundary of the effective input-area 170, a user can hold the remote control device 80 in front of the television 60 and look at the screen 200 through the transparent viewing screen 100 with one eye located at the position 90. Then, as shown in FIG. 2B, the user can adjust the location and/or the orientation of the viewing screen 100 to align the boundary of the effective input-area 170 with the display boundary of the screen 200. The user can also shift the position 90 of the eye to make the alignment. Once the boundary of the effective input-area 170 is aligned with the display boundary of the screen 200, the user can use the effective input-area 170 as the proxy touch surface for the screen 200, because each touch point within the effective input-area 170 has a one-to-one corresponding relationship with one equivalent touch point on the screen 200.

In the implementations as shown in FIGS. 2A-2B, the boundary-identifier 160 is displayed as four straight lines 161, 162, 163, and 164 forming the four sides of a quadrilateral. There are also other implementations for displaying the boundary-identifier 160. For example, in one implementation as shown in FIG. 3A, the boundary-identifier 160 is displayed as four corner points 101, 102, 103, and 104 specifying the corners of a quadrilateral that defines the effective input-area 170. In another implementation as shown in FIG. 3B, areas outside the quadrilateral for defining the effective input-area 170 are changed to opaque or semi-opaque to function as the boundary-identifier 160, with the edges of the effective input-area 170 clearly defined.

There are different ways of determining the effective input-area 170 and the boundary-identifier 160 on the viewing screen 100 before the correct boundary-identifier 160 is displayed on the viewing screen. In one implementation, as shown in FIG. 4, the user can look at the screen 200 through the transparent viewing screen 100 with one eye located at the position 90 while keeping the viewing screen 100 steadily at a particular location and orientation, and place a finger on the viewing screen 100 to trace the expected boundary of the effective input-area 170. During the tracing, a set of touching positions on the viewing screen 100 is detected. Subsequently, the boundary of the effective input-area 170 can be determined from this set of touching positions, and the boundary-identifier 160 on the viewing screen 100 can be determined as well. Instead of tracing the expected boundary of the effective input-area 170, in another implementation, the expected four corner points 101, 102, 103, and 104 of the effective input-area 170 are touched by a user to generate a set of touching positions, and this set of touching positions can be used to determine the boundary-identifier 160.

In some implementations, when the viewing screen 100 is implemented as a sensing screen (e.g., a touch-screen or a proximity-sensing screen), the set of touching positions can be determined by the electronics on the remote control 80. In some other implementations, as shown in FIG. 5, when the transparent viewing screen 100 is implemented as a variable-reflectivity screen, the set of touching positions can be determined by one or more cameras 310 fixed relative to the television screen 200. The reflectivity of the view screen at the position pressed by a finger can change optical reflectivity at certain wavelength. In some implementations, the position on the view screen pressed by a finger may appear to have its gray level changed or have its color changed. The change of gray level changed or the change of color can be observed by the camera 310. In the implementations shown in FIG. 5, the one or more cameras 310 can be implemented on the frame of the television 60 itself. In other implementations, the one or more cameras 310 can implemented on a separated box that is fixed relative to the television screen 200 during operation, and such separated box can be moved relative to the television 60 when it is not in used during operation. In FIG. 4 and FIG. 5, once the effective input-area 170 on the viewing screen 100 is determined, the mapping that maps a position (X, Y) on the television screen 200 to a corresponding position (x, y) on the viewing screen 100 can be determined, and alternatively, the mapping that maps a position (x, y) on the viewing screen 100 to a corresponding position (X, Y) on the television screen 200 can also be determined.

In addition to manually determine the effective input-area 170 on the viewing screen 100 as shown in FIG. 4 and FIG. 5, it is also possible to automatically determine the effective input-area 170. As shown in FIG. 6, four cameras 301, 302, 303, and 304 fixed relative to the television screen 200 are used to capture images of the eye at position 90 though the transparent viewing screen 100. With these captured images, the mapping that maps a position (X, Y) on the television screen 200 to a corresponding position (x, y) on the viewing screen 100 can be determined, and alternatively, the mapping that maps a position (x, y) on the viewing screen 100 to a corresponding position (X, Y) on the television screen 200 can also be determined. With these captured images, the effective input-area 170 on the viewing screen 100 can also be automatically determined. FIG. 7 illustrates the forward and reverse mapping between a position (X, Y) of point 250 on the television screen 200 to a corresponding position (x, y) of point 150 on the viewing screen 100 in accordance with some embodiments. In some implementations, such forward mapping or reverse mapping can be determined by the controller in the television 60, and the determined mapping can be wirelessly communicated to the remote control 80.

In one implementation, each of the captured images includes the image of the eye at position 90 within the image of the rectangular boundary of the viewing screen 100. With these captured images, the positions of the four cameras 301, 302, 303, and 304 in the coordinate X-Y-Z fixed relative to the television screen 60 are mapped to the corresponding positions in the coordinate x-y-z fixed relative to the viewing screen 100. If the positions of the four cameras 301, 302, 303, and 304 in the coordinate X-Y-Z fixed relative to the television screen 200 are known to be at predetermined positions, and if the corresponding positions in the coordinate x-y-z fixed relative to the viewing screen 100 are measured from the captured images, the mapping that maps a position (X, Y) on the television screen 200 to a corresponding position (x, y) on the viewing screen 100 can be determined. Consequently, as shown in FIG. 6, when the positions 201, 202, 203, and 204 are mapped to the corresponding positions 101, 102, 103, and 104 on the viewing screen 100 using the mapping determined from the captured images, the effective input-area 170 can also be determined. In some implementations, the corresponding positions 101, 102, 103, and 104 on the viewing screen 100 can be determined by the controller in the television 60, and the determined corresponding positions can be wirelessly communicated to the remote control 80.

In some implementations, the positions 201, 202, 203, and 204 are the corner positions of a display area on the television screen 200. In other implementations, the positions 201, 202, 203, and 204 can be other recognizable positions fixed relative to the television screen 200, and such recognizable positions can be used for the alignment of the viewing screen 100. Accordingly, when the positions 201, 202, 203, and 204 are not the corner positions of a display area on the television screen 200, boundary-identifier 160 can be used to specify an area other than the effective input-area 170.

FIG. 8 shows that, in accordance with some embodiments, a touch position (x, y) on the viewing screen can be mapped to a corresponding position (X, Y) on the television screen 200 using the mapping determined in real time while the boundary-identifier 160 for such mapping is displayed in real time. During operation, if the user aligns the boundary-identifier 160 with the edges of the television screen 200, a touch position 150 can be mapped to a corresponding position 250 on the television screen 200 with a mapping that is known or can be determined.

In some implementations, as shown in FIG. 9, the boundary-identifier 160 does not have to be displayed on the view screen 100, if the mapping between a corresponding position (x, y) on the viewing screen 100 and the corresponding position (X, Y) on the television screen 200 can be determined in real time. In FIG. 9, a touch position 150 can be mapped to a corresponding position 250 on the television screen 200 using the mapping determined in real time. With the embodiment as shown in FIG. 9, no boundary-identifier is displayed, because the user does not have to use a boundary-identifier on the viewing screen 100 to make alignment with some recognizable positions on the television screen 200 before a touch position 150 can be used as a proxy touching position for a corresponding position 250 on the television screen 200.

In some implementations, as shown in FIG. 10, the boundary-identifier 160 on the viewing screen 100 can be configured to have a shape that dynamically depends upon the location of the viewing screen 100 and the surface orientation of the viewing screen 100. Here, the surface orientation of the viewing screen 100 is the orientation of the normal vector n that is perpendicular to the viewing screen 100. In some implementations, the location of the viewing screen 100 can be characterize by the position $(X_0, Y_0, Z_0)$ of the origin 180 in the coordinate x-y-n fixed relative to the viewing screen 10.

In some implementations, as shown in FIG. 11, even if the boundary-identifier 160 on the viewing screen 100 is only manually determined with the mechanism as shown in FIG. 4 or FIG. 5, the boundary-identifier 160 on the viewing screen 100 can still be configured to have its shape dynamically depends upon the surface orientation of the viewing screen 100. For example, the remote control 80 can have gyroscopes or accelerometers to determine the surface orientation of the viewing screen 100 or the change of the surface orientation.

In one aspect, a method of interacting with a television screen using a remote control in accordance with some embodiments is described in the following. The remote control comprises a viewing screen having a surface orientation thereof defined by the orientation of the normal vector perpendicular to the viewing screen. The method includes the following: (1) detecting, with electronics on the remote control, a first set of positions being touched on the viewing screen while the viewing screen is maintained at a first position and at a first surface orientation; (2) analyzing the set of positions being touched to determine the boundary of an effective input-area that has a shape substantially matching the shape of a quadrilateral; (3) displaying a boundary-identifier, on the viewing screen that is substantially transparent, to specify the boundary of the effective input-area; (4) detecting one or more positions being touched on the viewing screen after the boundary-identifier is displayed on the viewing screen; and (5) determining a mapping operative to map the quadrilateral to a rectangular that has a shape different from the shape of said quadrilateral. In some implementations, the quadrilateral can be an irregular quadrilateral, or a trapezoid.

The method can further include determining at least one mapped position on the television screen, wherein the at least one mapped position is mapped from a position among the one or more touching positions on the viewing screen of the remote control under said mapping.

The method can further include determining the shape of the effective input-area while the viewing screen is at a current surface orientation. In some implementations, such determining the shape of the effective input-area can include measuring the first surface orientation of the viewing screen, and measuring the current surface orientation of the viewing screen. In some implementations, such determining the shape of the effective input-area can include analyzing multiple shape-setting parameters including (1) the shape of the effective input-area while the viewing screen is at the first surface orientation, (2) the first surface orientation of the viewing screen, and (3) the current surface orientation of the viewing screen.

In one aspect, a method of interacting with a television screen using a remote control in accordance with some embodiments is described in the following. The remote control comprises a viewing screen. The method includes the following: (1) displaying a boundary-identifier, on the viewing screen that is substantially transparent, to specify the boundary of an effective input-area; (2) detecting one or more positions being touched on the viewing screen after the boundary-identifier is displayed on the viewing screen; and (3) determining at least one mapped position on the television screen, wherein the at least one mapped position is mapped from a position among the one or more touching positions on the viewing screen of the remote control under a mapping operative to map one of an irregular quadrilateral and a trapezoid to a rectangular. In some implementations, the method can include determining the mapping operative to map one of an irregular quadrilateral and a trapezoid to a rectangular. In some implementations, the method can include determining the shape of the effective input-area, and analyzing the shape of the effective input-area to determine said mapping.

In one aspect, a method of interacting with a television screen using a remote control in accordance with some embodiments is described in the following. The remote control comprises a viewing screen. The method includes the following: (1) determining the shape of an effective input-area under an operation condition that the shape of an effective input-area depends upon at least one of the surface orientation of the viewing screen and the location of the viewing screen, wherein the surface orientation of the viewing screen is the orientation of the normal vector perpendicular to the viewing screen; (2) displaying a boundary-identifier, on the viewing screen that is substantially transparent, to specify the boundary of the effective input-area; and (3) detecting one or more positions being touched on the viewing screen after the boundary-identifier is displayed on the viewing screen. In such method, said determining the shape of the effective input-area comprises (1) determining a quadrilateral for mapping to a rectangular that has a shape different from the shape of said quadrilateral and (2) matching the shape of effective input-area substantially with the shape of said quadrilateral. In some implementations, the method can include determining a mapping operative to map said quadrilateral to said rectangular.

In one aspect, a method of interacting with a television screen using a remote control in accordance with some embodiments is described in the following. The remote control comprises a viewing screen. The method includes the following: (1) displaying a boundary-identifier, on the viewing screen that is substantially transparent, to specify the boundary of an effective input-area having a shape thereof dynamically depending upon at least one of the location of the viewing screen and the surface orientation of the viewing screen, wherein the surface orientation of the viewing screen is the orientation of the normal vector perpendicular to the viewing screen; and (2) detecting one or more positions being touched on the viewing screen after the boundary-identifier is displayed on the viewing screen. In some implementations, the effective input-area has a shape that is essentially a quadrilateral, wherein said quadrilateral includes one of an irregular quadrilateral, a trapezoid, and a rectangular.

In some implementations, the method can further include determining a mapping operative to map a quadrilateral to a rectangular that has a shape different from the shape of said quadrilateral. In some implementations, the method can further include determining the shape of the effective input-area, and analyzing the shape of the effective input-area to determine a mapping operative to map a quadrilateral to a rectangular that has a shape different from the shape of said quadrilateral.

In some implementations, said displaying a boundary-identifier comprises: displaying the boundary-identifier to specify the boundary of an effective input-area having the shape thereof dynamically depending upon BOTH the location of the viewing screen and the surface orientation of the viewing screen. In some implementations, said displaying a boundary-identifier comprises: displaying the boundary-identifier to specify the boundary of the effective input-area while substantially maintaining the shape of the effective input-area when the viewing screen is rotated about an axis parallel to the normal vector of the viewing screen. In some implementations, said displaying a boundary-identifier comprises: displaying the boundary-identifier to specify the boundary of an effective input-area having the shape thereof dynamically depending upon the surface orientation of the viewing screen. In some implementations, said displaying a boundary-identifier comprises: displaying the boundary-identifier to specify the boundary of an effective input-area having the shape thereof dynamically depending upon the location of the viewing screen. In some implementations, the effective input-area also has a size thereof dynamically depending upon a distance between the viewing screen and a reference looking-point.

In some implementations, the method can further include determining at least one mapped position on the television screen, wherein the at least one mapped position is mapped from a position among the one or more touching positions on the viewing screen of the remote control under a mapping operative to map a quadrilateral to a rectangular, wherein said rectangular having a shape different from the shape of said quadrilateral.

In some implementations, the method can further include determining at least one mapped position on the television screen, wherein the at least one mapped position is mapped from a position among the one or more touching positions on the viewing screen of the remote control under a mapping from the effective area on the viewing screen to the display area on the television screen under the constrain that the boundary of the effective area on the viewing screen is essentially mapped to the boundary of the display area on the television screen With respect to each of the above described aspects of the invention, implementations of the invention can include one or more of the following features.

The viewing screen can have a diagonal length between 40 mm to 400 mm. In some implementations, the viewing screen is a touching screen, and the detecting the one or more positions being touched on the viewing screen can include detecting the one or more positions being touched on the viewing screen with electronics on the remote control.

The detecting the one or more positions being touched on the viewing screen can include detecting the one or more positions being touched on the viewing screen with one or more cameras fixed relative to the television screen. In some implementations, the optical reflectivity at the one or more positions being touched on the viewing screen can be changed with touching.

In some implementations, the mapping is a mapping that is the reverse of a forward mapping belonging to a mapping class, wherein a member mapping in said mapping class maps a position (X,Y) on the television screen to a position (x, y) on the viewing screen, and said member mapping is identifiable by relationships $x=x_0[(X-X_0)C_{11}+(Y-Y_0)C_{12})]/[(1+a(X-X_0)+b(Y-Y_0)]$ and $y=y_0+[(X-X_0)C_{21}+(Y-Y_0)C_{22})]/[(1+a(X-X_0)+b(Y-Y_0)]$ with parameters $a, b, C_{11}, C_{12}, C_{21}, C_{22}, X_0, Y_0, x_0$, and $y_0$. In some implementations, at least one of the parameters a and b is non-zero. In some implementations, $X_0=0, Y_0=0, x_0=0$, and $y_0=0$. Some of the methods can include determining the value of the parameters $a, b, C_{11}, C_{12}, C_{21}, C_{22}, X_0, Y_0, x_0$, and $y_0$ in said member mapping. Some of the methods can include (1) determining at least four positions on the viewing screen each corresponding to one of known positions on the television screen; and (2) applying said member mapping between each of the at least four positions on the viewing screen and the corresponding known position on the television screen to determine the value of the parameters $a, b, C_{11}, C_{12}, C_{21}$, and $C_{22}$ in said member mapping.

In some implementations, the mapping is a mapping belonging to a mapping class wherein a member mapping maps a position (x, y) on the viewing screen to a position (X, Y) on the television screen, and said member mapping is identifiable by relationships $X=X_0+[(x-x_0)D_{11}+(y-y_0)D_{12}]/[1+p(x-x_0)+q(y-y_0)]$ and $Y=Y_0+[(x-x_0)D_{21}+(y-y_0)D_{22}]/[1+p(x-x_0)+q(y-y_0)]$ with parameters $p, q, D_{11}, D_{12}, D_{21}, D_{22}, X_0, Y_0, X_0$, and $y_0$. In some implementations, at least one of the parameters p and q is non-zero. In some implementations, $X_0=0, Y_0=0, x_0=0$, and $y_0=0$. Some of the methods can include determining the value of the parameters $p, q, D_{11}, D_{12}, D_{21}, D_{22}, X_0, Y_0, x_0$, and $y_0$ in said member mapping. Some of the methods can include (1) determining at least four positions on the viewing screen each corresponding to one of known positions on the television screen; and (2) applying said member mapping between each of the at least four positions on the viewing screen and the corresponding known position on the television screen to determine said member mapping.

The determining the mapping can include determining the mapping with a camera fixed relative to the television screen. The determining the mapping can include determining the mapping with two cameras fixed relative to the television screen. The determining the mapping can include determining the mapping with four cameras fixed relative to the television screen. The determining the mapping can include determining the mapping with a camera on the remote control. The determining the mapping can include determining the mapping with two cameras on the remote control.

The determining the shape of the effective input-area can include determining the shape with a camera fixed relative to the television screen. The determining the shape of the effective input-area can include determining the shape with two cameras fixed relative to the television screen. The determining the shape of the effective input-area can include determining the shape with four cameras fixed relative to the television screen. The determining the shape of the effective input-area can include determining the shape with a camera on the remote control. The determining the shape of the effective input-area can include determining the shape with two cameras on the remote control.

Some of the methods can include determining the position of the viewing screen. Some of the methods can include determining the surface orientation of the viewing screen. Some of the methods can include determining both the surface orientation of the viewing screen and the frame orientation of the viewing screen. Some of the methods can include determining the frame orientation of the viewing screen.

In one aspect, a method of interacting with a television screen using a remote control in accordance with some embodiments is described in the following. The remote control comprises a viewing screen. The method includes the following: (1) displaying a boundary-identifier, on the viewing screen that is substantially transparent, to specify the boundary of the effective input-area; (2) detecting one or more positions being touched on the viewing screen after the boundary-identifier is displayed on the viewing screen; and (3) determining at least one mapped position on the television screen, wherein the at least one mapped position is mapped from a position among the one or more touching positions on the viewing screen of the remote control under a mapping that is the reverse of a forward mapping belonging to a mapping class, wherein a member mapping in said mapping class maps a position (X,Y) on the television screen to a position (x, y) on the viewing screen, and said member mapping is identifiable by relationships $x=x_0+[(X-X_0)C_{11}+(Y-Y_0)C_{12}]/[(1+a(X-X_0)+b(Y-Y_0)]$ and $y=y_0+[(X-X_0)C_{21}+(Y-Y_0)C_{22}]/[(1+a(X-X_0)+b(Y-Y_0)]$ with parameters $a, b, C_{11}, C_{12}, C_{21}, C_{22}, X_0, Y_0, x_0$, and $y_0$, and wherein at least one of the parameters a and b is non-zero.

In one aspect, a method of interacting with a television screen using a remote control in accordance with some embodiments is described in the following. The remote control comprises a viewing screen. The method includes the following: (1) displaying a boundary-identifier, on the viewing screen that is substantially transparent, to specify the boundary of the effective input-area; (2) detecting one or more positions being touched on the viewing screen after the boundary-identifier is displayed on the viewing screen; and (3) determining at least one mapped position on the television screen, wherein the at least one mapped position is mapped from a position among the one or more touching positions on the viewing screen of the remote control under a mapping belonging to a mapping class wherein a member mapping maps a position (x, y) on the viewing screen to a position (X, Y) on the television screen, and said member mapping is identifiable by relationships $X=X_0+[(x-x_0)D_{11}+(y-y_0)D_{12}]/[1+p(x-x_0)+q(y-y_0)]$ and $Y=Y_0+[(x-x_0)D_{21}+(y-y_0)D_{22}]/[1+p(x-x_0)+q(y-y_0)]$ with parameters $p, q, D_{11}, D_{12}, D_{21}, D_{22}, X_0, Y_0, x_0$, and $y_0$, and wherein at least one of the parameters p and q is non-zero.

In one aspect, a method of interacting with a television screen using a remote control having a viewing screen in accordance with some embodiments is described in the following. The remote control comprises a viewing screen having a surface orientation thereof defined by the orientation of the normal vector perpendicular to the viewing screen. The method includes the following: (1) imaging the viewing screen that is substantially transparent with one or more cameras fixed relative to the television screen while the viewing screen having a boundary-identifier displayed to specify the boundary of an effective input-area that has a shape substantially matching the shape of a quadrilateral, wherein the quadrilateral includes one of an irregular quadrilateral and a trapezoid; and (2) detecting one or more positions being touched on the viewing screen after the boundary-identifier is displayed on the viewing screen.

Implementations of the invention can include one or more of the following features. The method can include determining a mapping operative to map the quadrilateral to a rectangular that has a shape different from the shape of said quadrilateral. The method can include determining at least one mapped position on the television screen, wherein the at least one mapped position is mapped from a position among the one or more touching positions on the viewing screen of the remote control under said mapping. The method can include analyzing the shape of the effective input-area in one or more images of the viewing screen to determine a mapping operative to map the quadrilateral to a rectangular that has a shape different from the shape of said quadrilateral.

In some implementations, the method can further include the following: (1) detecting, with electronics on the remote control, a first set of positions being touched on the viewing screen while the viewing screen is maintained at a first position and at a first surface orientation; (2) analyzing the set of positions being touched to determine the boundary of the effective input-area. In other implementations, the method can further include the following: (1) detecting, with at least one of the one or more cameras fixed relative to the television screen, a first set of positions being touched on the viewing screen while the viewing screen is maintained at a first position and at a first surface orientation; and (2) analyzing the set of positions being touched to determine the boundary of the effective input-area.

The method can include determining at least one mapped position on the television screen, wherein the at least one mapped position is mapped from a position among the one or more touching positions on the viewing screen of the remote control under a mapping operative to map one of an irregular quadrilateral and a trapezoid to a rectangular. The method can further include determining the mapping operative to map one of an irregular quadrilateral and a trapezoid to a rectangular. The method can further include analyzing the shape of the effective input-area in one or more images of the viewing screen to determine said mapping.

In one aspect, a method of interacting with a television screen using a remote control in accordance with some embodiments is described in the following. The method includes the following: (1) imaging the viewing screen that is substantially transparent with at least two cameras fixed relative to the television screen, the viewing screen that is substantially transparent; (2) detecting, with at least one of the at least two cameras fixed relative to the television screen, one or more positions being touched on the viewing screen; and (3) analyzing images of the viewing screen to determine the boundary of an effective input-area that has a shape substantially matching the shape of a quadrilateral, wherein the quadrilateral includes one of an irregular quadrilateral and a trapezoid. In some Implementations, the viewing screen is operative to display a boundary-identifier to specify the boundary of the effective input-area. In some implementations, the method can include detecting, with the at least one of the at least two cameras fixed relative to the television screen, one or more positions being touched on the viewing screen after a boundary-identifier is displayed on the viewing screen to specify the boundary of the effective input-area.

In one aspect, a method of interacting with a television screen using a remote control in accordance with some embodiments is described in the following. The method includes the following: (1) imaging the viewing screen that is substantially transparent with at least two cameras fixed relative to the television screen; (2) detecting, with at least one of the at least two cameras fixed relative to the television screen, one or more positions being touched on the viewing screen; and (3) analyzing images of the viewing screen to determine a mapping operative to map a quadrilateral to a rectangular that has a shape different from the shape of said quadrilateral. In some implementations, said quadrilateral can be one of an irregular quadrilateral and a trapezoid. In some Implementations, the viewing screen is operative to display a boundary-identifier to specify the boundary of the effective input-area. In some implementations, the method can include detecting, with the at least one of the at least two cameras fixed relative to the television screen, one or more positions being touched on the viewing screen after a boundary-identifier is displayed on the viewing screen to specify the boundary of the effective input-area.

In one aspect, a remote control for controlling a television screen in accordance with some embodiments is described in the following. The remote control includes the following: (1) a viewing screen that is substantially transparent and has a diagonal length between 40 mm to 400 mm, wherein the viewing screen is operative to detect at least one touching position on the viewing screen, and wherein the viewing screen is also operative to display a boundary-identifier on the viewing screen to specify the boundary of an effective input-area; and (2) a controller configured to determine the boundary of the effective input-area from a first set of touching positions detected by the viewing screen while the viewing screen is maintained at a first position and at a first surface orientation screen, with the shape of the effective input-area substantially matching the shape of a quadrilateral, and to determine a mapping operative to map the quadrilateral to a rectangular that has a shape different from the shape of said quadrilateral. In some implementations, the controller is configured to determine one or more mapped touching position on the television screen, wherein each mapped touching position on the television screen is mapped, under said mapping, from a corresponding touching position on the viewing screen detected by the viewing screen after the boundary-identifier is displayed on the viewing screen. In some implementations, the remote control also includes a transmitter configured to transmit to the television wirelessly data describing said mapping.

In one aspect, a remote control for controlling a television screen in accordance with some embodiments is described in the following. The remote control includes the following: (1) a viewing screen that is substantially transparent and has a diagonal length between 40 mm to 400 mm, wherein the viewing screen is operative to detect at least one touching position on the viewing screen, and wherein the viewing screen is also operative to display a boundary-identifier on the viewing screen to specify the boundary of an effective input-area that has a shape substantially matching the shape of a quadrilateral; and (2) a controller configured to determine one or more mapped touching position on the television screen with a mapping operative to map the quadrilateral to a rectangular that has a shape different from the shape of said quadrilateral, wherein each mapped touching position on the television screen is mapped, under said mapping, from a corresponding touching position on the viewing screen detected by the viewing screen after the boundary-identifier is displayed on the viewing screen.

In one aspect, a remote control for controlling a television screen in accordance with some embodiments is described in the following. The remote control includes the following: (1) a viewing screen that is substantially transparent and has a diagonal length between 40 mm to 400 mm, wherein the viewing screen is operative to detect at least one touching position on the viewing screen, and wherein the viewing screen is also operative to display a boundary-identifier to specify the boundary of an effective input-area on the viewing screen; (2) electronics configured to make the shape of the effective input-area changing with at least one of the location of the viewing screen and the surface orientation of the viewing screen, wherein the surface orientation of the viewing screen is the orientation of the normal vector of the viewing screen; and (3) a memory configured to store one or more touching positions detected by the viewing screen after the boundary-identifier is displayed on the viewing screen.

In some implementations, said electronics configured to make the shape of the effective input-area changing is further configured to make both the size and the shape of the effective input-area substantially invariant with respect to rotating of the viewing screen with respect to the normal vector of the viewing screen. In some implementations, The remote control can further include electronics configured to determine one or more mapped touching position on the television screen with a mapping operative to map a quadrilateral to a rectangular that has a shape different from the shape of said quadrilateral, wherein each mapped touching position on the television screen is mapped, under said mapping, from a corresponding touching position on the viewing screen detected by the viewing screen after the boundary-identifier is displayed on the viewing screen, wherein the shape of the quadrilateral substantially matches the shape of the effective input-area.

Implementations of the invention can include one or more of the following features. In some implementations, the remote control can further include a transmitter configured to transmit to the television wirelessly data describing the one or more touching positions detected by the viewing screen. In some implementations, the remote control can further include a transmitter configured to transmit to the television wirelessly data describing the one or more mapped touching position.

In some implementations, said quadrilateral is one of an irregular quadrilateral and a trapezoid. In some implementations, said quadrilateral is one of an irregular quadrilateral, a trapezoid, and a rectangular. The remote control can further include a plurality of gyroscopes. The remote control can further include a plurality of accelerometers.

In some implementations, the remote control can further include (1) a camera configured to obtain an image of the television screen, and (2) electronics configured for analyzing the image of the television screen to determine the shape of the effective input-area. In some implementations, the remote control can further include (1) two cameras configured to obtain images of the television screen, and (2) electronics configured for analyzing the images of the television screen to determine the shape of the effective input-area.

In some implementations, the remote control can further include (1) a camera configured to obtain an image of the television screen, and (2) electronics configured for analyzing the image of the television screen to determine said mapping. In some implementations, the remote control can further include (1) two cameras configured to obtain images of the television screen, and (2) electronics configured for analyzing the images of the television screen to determine said mapping.

In the foregoing specification, specific embodiments have been described. However, one of ordinary skill in the art appreciates that various modifications and changes can be made without departing from the scope of the invention as set forth in the claims below. For example, the television screen described above can be the display screen of a television, a video box, a game console, or a computer. The television screen described above can also be an extended display of a mobile device, such as a smartphone or a tablet computer. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of interacting with a television screen using a remote control, wherein the remote control comprises a viewing screen, the method comprising:

determining an effective input-area on the viewing screen that is substantially transparent, wherein said determining includes analyzing the image of the television screen obtained with a camera on the remote control;

displaying a boundary-identifier on the viewing screen to specify the boundary of the effective input-area;

detecting one or more positions being touched on the viewing screen after the boundary-identifier is displayed on the viewing screen;

determining at least one mapped position on the television screen, wherein the at least one mapped position is mapped from a position among the one or more touching positions on the viewing screen of the remote control under a mapping operative to map one of an irregular quadrilateral and a trapezoid to a rectangular.

2. The method of claim 1, further comprising:
determining the mapping operative to map one of an irregular quadrilateral and a trapezoid to a rectangular.

3. The method of claim 1, further comprising:
analyzing the shape of the effective input-area to determine said mapping.

4. The method of claim 1, wherein said detecting the one or more positions being touched on the viewing screen comprises:
detecting the one or more positions being touched on the viewing screen with electronics on the remote control, wherein the viewing screen is a sensing screen.

5. The method of claim 1, wherein the viewing screen is a variable-reflectivity screen, with the optical reflectivity changing at the one or more positions being touched on the viewing screen.

6. The method of claim 1, wherein said determining includes analyzing the images of the television screen obtained with two cameras on the remote control.

7. The method of claim 1, further comprising:
determining the surface orientation of the viewing screen.

8. The method of claim 1, further comprising:
determining the frame orientation of the viewing screen.

9. The method of claim 1, further comprising:
determining both the surface orientation of the viewing screen and the frame orientation of the viewing screen.

10. A remote control for controlling a television screen comprising:
a viewing screen that is substantially transparent and has a diagonal length between 40 mm to 400 mm, wherein the viewing screen is operative to detect at least one touching position on the viewing screen, and wherein the viewing screen is also operative to display a boundary-identifier on the viewing screen to specify the boundary of an effective input-area that has a shape substantially matching the shape of a quadrilateral;
a camera configured to obtain an image of the television screen; and
electronics configured for determining the effective input-area that includes analyzing the image of the television screen obtained with the camera.

11. The remote control of claim 10, further comprising:
two cameras configured to obtain images of the television screen; and
wherein the electronics is configured for determining the effective input-area that includes analyzing the images of the television screen obtained with the two cameras.

12. The remote control of claim 10, wherein said quadrilateral is one of an irregular quadrilateral and a trapezoid.

13. The remote control of claim 10, further comprising:
a transmitter configured to transmit to another device wirelessly data describing the one or more touching positions detected by the viewing screen.

14. The remote control of claim 10, further comprising:
a controller configured to determine one or more mapped touching position on the television screen with a mapping operative to map the quadrilateral to a rectangular that has a shape different from the shape of said quadrilateral, wherein each mapped touching position on the television screen is mapped, under said mapping, from a corresponding touching position on the viewing screen detected by the viewing screen after the boundary-identifier is displayed on the viewing screen.

15. The remote control of claim 14, further comprising:
a transmitter configured to transmit to another device wirelessly data describing the one or more mapped touching position.

16. The remote control of claim 10, further comprising:
a controller configured to make the boundary-identifier displayed on the viewing screen to specify the boundary of the effective input-area and to make the shape of the quadrilateral changing with at least one of the location of the viewing screen and the surface orientation of the viewing screen while making both the size and the shape of the quadrilateral substantially invariant with respect to rotating of the viewing screen with respect to the normal vector perpendicular to the viewing screen, wherein the surface orientation of the viewing screen is the orientation of the normal vector of the viewing screen.

17. The remote control of claim 10, further comprising:
a plurality of gyroscopes.

18. The remote control of claim 10, further comprising:
a plurality of accelerometers.

19. A remote control for controlling a television screen comprising:
a viewing screen that is substantially transparent and has a diagonal length between 40 mm to 400 mm, wherein the viewing screen is operative to display a boundary-identifier on the viewing screen to specify the boundary of an effective input-area that has a shape substantially matching the shape of a quadrilateral;
a controller configured to make the boundary-identifier displayed on the viewing screen to specify the boundary of the effective input-area and to make the shape of the quadrilateral changing with at least one of the location of the viewing screen and the surface orientation of the viewing screen while making both the size and the shape of the quadrilateral substantially invariant with respect to rotating of the viewing screen with respect to the normal vector perpendicular to the viewing screen, wherein the surface orientation of the viewing screen is the orientation of the normal vector of the viewing screen;
a camera configured to obtain an image of the television screen; and
electronics configured for determining the effective input-area that includes analyzing the image of the television screen obtained with the camera.

20. The remote control of claim 19, further comprising:
two cameras configured to obtain images of the television screen; and
wherein the electronics is configured for determining the effective input-area that includes analyzing the images of the television screen obtained with the two cameras.

* * * * *